United States Patent
Higaki et al.

(10) Patent No.: US 9,365,175 B2
(45) Date of Patent: Jun. 14, 2016

(54) POWER SUPPLY SYSTEM FOR VEHICLE

(75) Inventors: Yusuke Higaki, Tokyo (JP); Yuuya Tanaka, Tokyo (JP); Masaki Yamada, Tokyo (JP); Toshiyuki Yoshizawa, Tokyo (JP); Shigeki Harada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 444 days.

(21) Appl. No.: 13/995,254

(22) PCT Filed: Jun. 29, 2011

(86) PCT No.: PCT/JP2011/064912
§ 371 (c)(1),
(2), (4) Date: Jun. 18, 2013

(87) PCT Pub. No.: WO2012/098708
PCT Pub. Date: Jul. 26, 2012

(65) Prior Publication Data
US 2013/0264868 A1 Oct. 10, 2013

(30) Foreign Application Priority Data

Jan. 21, 2011 (JP) ................................. 2011-010431

(51) Int. Cl.
*B60L 1/00* (2006.01)
*B60R 16/033* (2006.01)
(Continued)

(52) U.S. Cl.
CPC ............. *B60R 16/033* (2013.01); *H02J 7/0013* (2013.01); *H02J 7/1423* (2013.01); *H02J 7/345* (2013.01); *Y02T 10/7005* (2013.01); *Y02T 10/7022* (2013.01); *Y02T 10/7055* (2013.01)

(58) Field of Classification Search
CPC ..... H02J 7/345; Y02T 10/7005; B60R 16/033

USPC .......................................................... 307/9.1
See application file for complete search history.

(56) References Cited

U.S. PATENT DOCUMENTS

| | | | |
|---|---|---|---|
| 2009/0127930 A1* | 5/2009 | Senda ..................... | B60R 16/03 307/9.1 |
| 2010/0076636 A1 | 3/2010 | Ichikawa | |
| 2011/0100735 A1* | 5/2011 | Flett ......................... | B60K 6/46 180/65.22 |
| 2012/0158245 A1 | 6/2012 | Yoshizawa et al. | |

FOREIGN PATENT DOCUMENTS

CN 101743679 A 6/2010
EP 2008 067504 3/2008
(Continued)

OTHER PUBLICATIONS

U.S. Appl. No. 14/009,804, filed Oct. 4, 2013, Harada, et al.
(Continued)

*Primary Examiner* — Jared Fureman
*Assistant Examiner* — Duc M Pham
(74) *Attorney, Agent, or Firm* — Oblon, McClelland, Maier & Neustadt, L.L.P.

(57) ABSTRACT

A first DC/DC converter is provided between a rectifier for rectifying output of an electric generator driven by an engine, and a battery for supplying power to an in-vehicle load. An electric double layer capacitor and a second DC/DC converter for charge/discharge current control for the capacitor are provided between the rectifier and the first DC/DC converter. A control circuit sets a current target value which is a control target value for the second DC/DC converter, based on the voltage value of a battery bus, and when charging of the electric double layer capacitor is to be stopped based on a charge/discharge instruction signal, performs, before the charging is stopped, control of gradually attenuating the current target value for the second DC/DC converter, based on a voltage value $V_{EDLC}$ of the electric double layer capacitor.

10 Claims, 7 Drawing Sheets

(51) Int. Cl.
*H02J 7/34* (2006.01)
*H02J 7/00* (2006.01)
*H02J 7/14* (2006.01)

(56) References Cited

FOREIGN PATENT DOCUMENTS

| JP | 2009-22138 A | 1/2009 |
| JP | 2009-130961 A | 6/2009 |
| WO | WO 2009/011322 A1 | 1/2009 |
| WO | 2012 137343 | 10/2012 |

OTHER PUBLICATIONS

Combined Chinese Office Action and Search Report issued Dec. 23, 2014 in Patent Application No. 201180065462.6 (with English Translation and English Translation of Category of Cited Documents).

International Search Report Issued Oct. 11, 2011 in PCT/JP11/64912 Filed Jun. 29, 2011.

* cited by examiner

POWER SUPPLY SYSTEM FOR VEHICLE

TECHNICAL FIELD

The present invention relates to a power supply system for vehicle, and particularly, to a power supply system for vehicle that can realize regeneration of braking energy of a vehicle and improvement in fuel efficiency of the vehicle.

BACKGROUND ART

Among conventional power supply systems for vehicle, a power supply system for vehicle has been proposed that, upon deceleration of a vehicle, aggressively performs regeneration of braking energy by setting voltage generated by an electric generator which is driven by an engine and feeds power to a battery, to be higher than the voltage upon non-deceleration (acceleration or cruising traveling), and meanwhile, upon non-deceleration of the vehicle, reduces load on the engine to improve fuel efficiency by setting the generated voltage to be lower than the voltage upon deceleration (for example, Patent Document 1).

However, since such a conventional power supply system for vehicle is configured to charge the battery by directly feeding the power generated by the electric generator to the battery, greatly changing the power generated by the electric generator leads to reduction of the life of the battery. Therefore, there is a problem that the range of increasing the power generated by the electric generator cannot be broadened, so that the braking energy cannot be regenerated aggressively upon deceleration of the vehicle.

CITATION LIST

Patent Document

Patent Document 1: Japanese Laid-Open Patent Publication No. 2008-67504

SUMMARY OF THE INVENTION

Problems to be Solved by the Invention

In order to solve the above problem, the applicant of the present application has proposed a power supply system for vehicle in which a first DC/DC converter is provided between a rectifier for rectifying output of an electric generator and a battery for supplying power to an in-vehicle load, and an electric storage device such as an electric double layer capacitor for power leveling, and a second DC/DC converter for charge/discharge current control for the electric storage device are provided between the rectifier and the first DC/DC converter. Further, in the power supply system for vehicle, the power generated by the electric generator is stored into the battery and the electric storage device by performing drive control of the first and second DC/DC converters by a control circuit (Japanese Patent Application No. 2009-239380).

Owing to the configuration of Japanese Patent Application No. 2009-239380, it becomes possible to keep appropriate the voltage of each section of the power supply system for vehicle and also broaden the range of increasing the power generated by the electric generator, thereby aggressively regenerating the braking energy for the vehicle and also improving fuel efficiency.

However, as a result of further earnest consideration of the above power supply system for vehicle, the inventors of the present application has found that there is still the following problem remaining.

That is, an electric storage device such as an electric double layer capacitor has a limit to the charge/discharge allowable range, and repetition of overcharge or overdischarge beyond the limitation leads to reduction of the life of the electric storage device and reduction of usage efficiency. Therefore, the upper and lower limit values defining the charge/discharge allowable voltage range of the electric storage device are set in advance, and if the upper or lower limit value is exceeded, charge operation or discharge operation for the electric storage device by the second DC/DC converter is stopped.

On the other hand, since the electric generator is driven by the engine, it is difficult to quickly stop generation of the generated power or the regenerative power. Therefore, when the upper or lower limit value set in advance for the electric storage device is exceeded as described above, even if the charge/discharge operation for the electric storage device by the second DC/DC converter is stopped, excess or deficiency of the generated power occurs due to the response delay of the electric generator. As a result, a problem has been found that, in the case of using an electric generator with long response delay, rapid voltage variation occurs, and therefore the life of the battery reduces or excessive load is applied to the first and second DC/DC converters.

The present invention has been made to solve the above problem, and provides a power supply system for vehicle that can prevent occurrence of excess or deficiency of generated power due to response delay of an electric generator when charging or discharging of an electric storage device such as an electric double layer capacitor is stopped, thus enabling effective suppression of occurrence of rapid voltage variation even in the case of using such an electric generator with long response delay.

Solution to the Problems

A power supply system for vehicle according to the present invention includes: an electric generator driven by an engine, for generating AC power; a rectifier for rectifying the AC power generated by the electric generator to DC power and outputting the DC power to an electric generation bus; a battery for supplying power to an in-vehicle load via a battery bus; a first DC/DC converter for performing voltage conversion, having an input end connected to the electric generation bus and an output end connected to the battery bus; an electric storage device for storing generated power from the electric generator, thereby absorbing power variation; a second DC/DC converter for performing voltage conversion, having an input end connected to the electric generation bus and an output end connected to the electric storage device; and a control circuit for controlling the first and second DC/DC converters. The second DC/DC converter is a DC/DC converter of current-control type which keeps current for the electric storage device at a predetermined current target value. The control circuit sets a current target value which is a control target value for the second DC/DC converter, based on at least one of a voltage value of the electric generation bus and the voltage value of the battery bus, and when charging of the electric storage device is to be stopped based on a charge/discharge instruction signal, performs, before the charging is stopped, control of gradually attenuating the current target value for the second DC/DC converter, based on the voltage value of the electric storage device.

Effect of the Invention

According to the power supply system for vehicle of the present invention, when charging of the electric storage device is to be ended based on a charge/discharge instruction signal, before the charging is ended, control of gradually attenuating the current target value for the second DC/DC converter is performed based on the voltage value of the electric storage device, thereby effectively suppressing occurrence of rapid voltage variation due to response delay of the electric generator. Thus, the life of each section of the power supply system can be prolonged, and the battery voltage can be stabilized.

DESCRIPTION OF EMBODIMENTS

Embodiment 1

Figure 1:
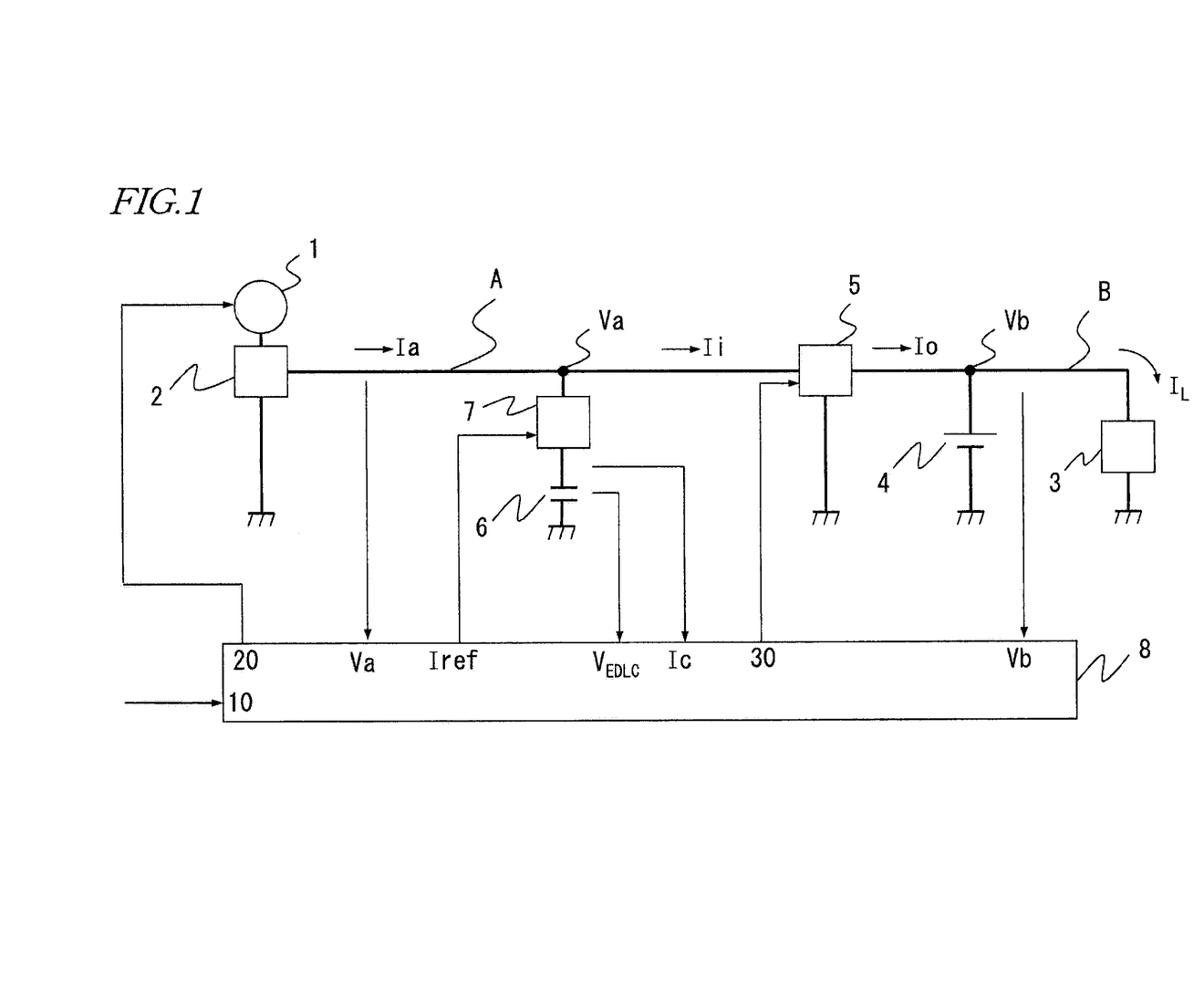
FIG. 1 is a circuit block diagram showing the configuration of a power supply system for vehicle according to embodiment 1 of the present invention.

FIG. 1 is a circuit block diagram showing the configuration of a power supply system for vehicle according to embodiment 1 of the present invention.

The power supply system for vehicle of embodiment 1 includes: an electric generator 1 driven by an engine (not shown), for generating AC power; a rectifier 2 for rectifying AC power generated by the electric generator 1 to DC power and outputting the DC power to an electric generation bus A; a battery 4 for supplying power to an in-vehicle load 3 via a battery bus B; an electric double layer capacitor 6 as an electric storage device for absorbing power variation in generated power or regenerative power from the electric generator 1; a first DC/DC converter 5 having an input end connected to the electric generation bus A and an output end connected to the battery bus B; a second DC/DC converter 7 having an input end connected to the electric generation bus A and an output end connected to the electric double layer capacitor 6; and a control circuit 8 for controlling the electric generator 1, the first DC/DC converter 5, and the second DC/DC converter 7. It is noted that regenerative power is power obtained by converting kinetic energy of a vehicle to electric energy by the electric generator 1 and retrieving the electric energy.

The relationship between charging or discharging of the electric double layer capacitor 6 and traveling of the vehicle is as follows. Charging of the electric double layer capacitor 6 is performed upon deceleration of the vehicle, and discharging from the electric double layer capacitor 6 is performed upon non-deceleration (acceleration or cruising traveling) of the vehicle. In addition, in accordance with switching between deceleration operation and non-deceleration operation of the vehicle, a charge/discharge instruction signal is switched.

Here, the above electric generator 1 is, for example, a Lundell-type AC electric generator that includes a claw-pole-type rotor having a field winding, a stator having three-phase AC windings, and a regulator circuit. In addition, the rectifier 2 is composed of a three-phase full-wave rectification circuit, and rectifies AC power induced on the three-phase AC windings of the electric generator 1 to DC power.

The battery 4 is a secondary battery such as a lead-acid battery or a nickel-cadmium battery, and has a rated current of, for example, 14V. In addition, the electric double layer capacitor 6 as an electric storage device serves a role of leveling supply power to the battery 4 side, by storing generated power or regenerative power from the electric generator 1 or compensating for deficiency of power of the battery 4, for example. It is noted that instead of the electric double layer capacitor 6, a lithium-ion battery, a nickel-metal hydride battery, or the like can be used as the electric storage device.

Figure 2:
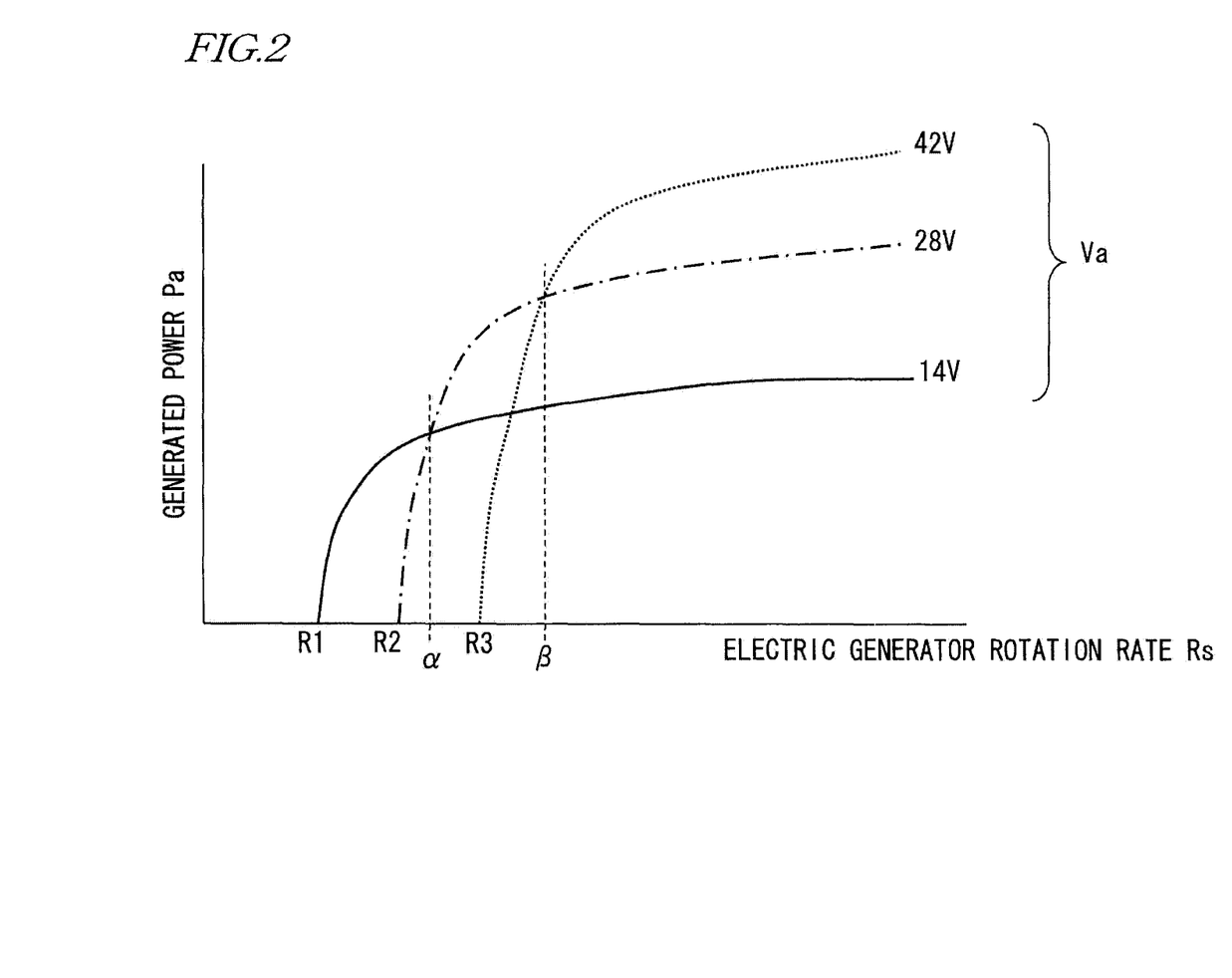
FIG. 2 is a diagram showing the output characteristic of an electric generator used in the power supply system for vehicle according to embodiment 1 of the present invention.

FIG. 2 shows the relationship between the electric generator rotation rate and generated power Pa when electric generation bus voltage Va is 14V (continuous line), 28V (dashed-dotted line), and 42V (dashed line).

In FIG. 2, there are characteristics that, in the case where the electric generation bus voltage Va is constant (Va=14V, 28V, 42V), if the rotation rate is equal to or smaller than a predetermined minimum value (Rs=R1, R2, R3), the generated power Pa is zero, and as the rotation rate increases exceeding the predetermined minimum value, the generated power Pa gradually increases to converge at a constant value. In addition, at the same rotation rate, the higher the electric generation bus voltage Va is, the higher the convergence value of the generated power Pa is. In addition, the higher the electric generation bus voltage Va is, the greater the minimum value of the rotation rate at which the generated power Pa becomes zero is.

The AC power generated by the electric generator 1 is converted to DC power by the rectifier 2, and the DC power is converted to voltage adapted to the battery 4 by the first DC/DC converter 5, whereby the voltage is supplied to the battery 4. In addition, the second DC/DC converter 7 performs an operation of charging the electric double layer capacitor 6 by using DC power of the electric generation bus A, and an operation of supplying DC power to the electric generation bus A by using DC power stored in the electric double layer capacitor 6.

Here, as the first DC/DC converter 5, a DC/DC converter of constant-input-voltage type which keeps its input end at predetermined target voltage, or a DC/DC converter of constant-step-up/down-ratio type which keeps its input-output voltage ratio at a predetermined target voltage ratio, is applied. It is noted that as the first DC/DC converter 5, a bidirectional DC/DC converter can also be used. In addition, the target voltage or target voltage ratio of the first DC/DC converter 5 is switched so as to cause the electric generation bus voltage Va to be 14V, 28V, or 42V, for example.

In the case of applying the DC/DC converter of constant-input-voltage type as the first DC/DC converter 5, a general DC/DC converter such as a step-down chopper circuit which is controlled by feedback control so as to keep the voltage of its input end at target voltage can be used, for example. On the other hand, in the case of applying the DC/DC converter of constant-step-up/down-ratio type as the first DC/DC converter 5, a DC/DC converter controlled so as to keep the switching duty ratio of a step-down chopper circuit at a predetermined value, or a converter as disclosed in International Publication No. WO2008/032424, is applied.

Figure 3:
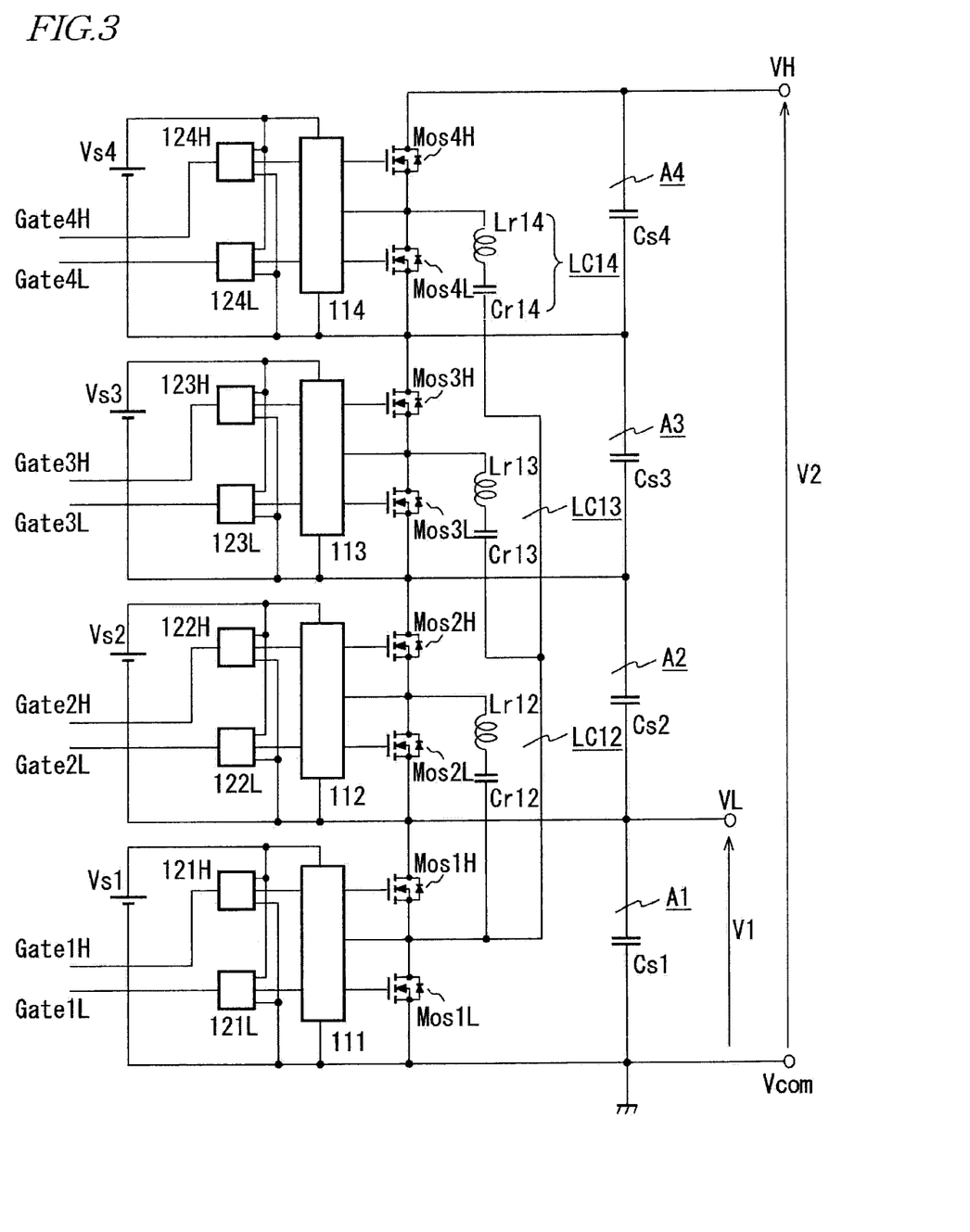
FIG. 3 is a circuit diagram showing an example of the configuration of a first DC/DC converter used in the power supply system for vehicle according to embodiment 1 of the present invention.

FIG. 3 is a circuit diagram showing a DC/DC converter described in International Publication No. WO2008/032424. In FIG. 3, the DC/DC converter includes smoothing capacitors (Cs1) to (Cs4), switching devices (Mos1L, Mos1H) to (Mos4L, Mos4H), energy transfer capacitors (Cr12) to (Cr14), and reactors (Lr12) to (Lr14), and transfers electric charge among the above capacitors, using LC resonance of series resonance units (LC12) to (LC14), through ON/OFF operations of the above switching devices (Mos1L, Mos1H) to (Mos4L, Mos4H), thereby keeping the voltage ratio (V1:V2) between the input and output terminals at a predetermined integral multiple. Although the above converter has a restriction that the voltage ratio between the input and output terminals should be an integral multiple, as compared to a general DC/DC converter of chopper type, the above converter has a feature that a large-size reactor is not needed and therefore very high efficiency can be obtained with a small-size configuration. The details of the operation of this converter are specifically described in International Publication No. WO2008/032424. Therefore, the description thereof is omitted here.

On the other hand, as the second DC/DC converter 7, a DC/DC converter of current control type which controls its input current or output current so as to keep battery bus voltage Vb at a predetermined voltage target value, is applied. In addition, the second DC/DC converter 7 needs to perform bidirectional operations including charging and discharging for the electric double layer capacitor 6. Therefore, it is essential that the second DC/DC converter 7 is a DC/DC converter of bidirectional type which allows the input-output direction to be inversed.

It is noted that, here, for convenience of description, one of the input and output terminals of the second DC/DC converter 7 that is connected to the electric generation bus A is referred to as "input", and the other one that is connected to the electric double layer capacitor 6 is referred to as "output", and thus they do not necessarily represent a transfer direction of power. For example, in the case where electric charge of the electric double layer capacitor 6 is discharged to the electric generation bus A via the second DC/DC converter 7, current flows in from the "output" side and flows out from the "input" side, and power transfers from the "output" side to the "input" side.

The control circuit 8 detects and obtains the electric generation bus voltage Va applied to the electric generation bus A, the battery bus voltage Vb applied to the battery bus B, voltage $V_{EDLC}$ of the electric double layer capacitor 6, and current Ic of the second DC/DC converter 7 upon charging or discharging of the electric double layer capacitor 6, and receives a charge/discharge instruction signal 10 from a control unit (not shown). Then, based on the detected values and the charge/discharge instruction signal, the control circuit 8 outputs a power generation instruction 20 to the electric generator 1, a step-up/down ratio instruction value 30 to the first DC/DC converter 5, and a current target value Iref to the second DC/DC converter 7.

In this case, the control circuit 8 determines the current target value Iref for the second DC/DC converter 7 to perform charging or discharging of the electric double layer capacitor 6, based on a deviation $\Delta Vb$ (=Vbref−Vb) between a battery bus voltage target value Vbref set in advance and the detected battery bus voltage Vb. The battery bus voltage target value Vbref in this case is determined based on the rated voltage of the battery 4. For example, if the battery 4 is a lead-acid battery having rated voltage of 12.6V, the battery bus voltage target value Vbref is set at about 14V.

In addition, the control circuit 8 controls generated power of the electric generator 1 so as to make the battery bus voltage Vb converge to a battery bus voltage target value Vbref* for the electric generator 1. The battery bus voltage target value Vbref* for the electric generator 1 in this case is, upon charging of the electric double layer capacitor 6, set to be higher than the above battery bus voltage target value Vbref for the second DC/DC converter 7, and upon discharging from the electric double layer capacitor 6, set to be lower than the battery bus voltage target value Vbref for the second DC/DC converter 7. Thus, upon charging of the electric double layer capacitor 6, regenerative power from the electric generator 1 can be efficiently stored into the battery 4 and the electric double layer capacitor 6, and upon discharging from the electric double layer capacitor 6, the power stored in the electric double layer capacitor 6 can be stored into the battery 4 while the engine load is reduced.

In addition, in embodiment 1, the control circuit 8 monitors variation in the voltage $V_{EDLC}$ due to charging or discharging of the electric double layer capacitor 6, and when the voltage $V_{EDLC}$ has reached an upper limit value $V_{MAX}$ or a lower limit value $V_{MIN}$ prescribed in consideration of a rated capacity and usage efficiency in advance, stops the operation of the second DC/DC converter 7. In this case, the control circuit 8 is programmed to perform, before the stopping processing, control processing of gradually attenuating the above current target value Iref for the second DC/DC converter 7, based on the voltage value $V_{EDLC}$ the electric double layer capacitor 6 (hereinafter, the processing is referred to as current target value attenuation processing). Thus, when charging or discharging of the electric double layer capacitor 6 is to be stopped, the current target value attenuation processing is performed in advance, thereby gradually suppressing the current Ic received from or outputted to the electric double layer capacitor 6 by the second DC/DC converter 7. Thus, it become possible to prevent occurrence of excess or deficiency of the generated power due to the response delay of the electric generator 1.

Next, the specific way of the above current target value attenuation processing will be described.

The current target value attenuation processing is processing of gradually attenuating the current target value Iref by multiplying the current target value Iref for the second DC/DC converter 7 by a factor in a range of "0" to "1", for example.

For this processing, a threshold value Vth1 lower than the upper limit value $V_{MAX}$ and a threshold value Vth2 higher than the lower limit value $V_{MIN}$ for the electric double layer capacitor 6 are set, and the current target value attenuation processing for the second DC/DC converter 7 is performed using the threshold values Vth1 and Vth2 as boundaries. That is, in the case where the electric double layer capacitor 6 is charged with the regenerative power from the electric generator 1 by the charge/discharge instruction signal, when the voltage $V_{EDLC}$ has become higher than the threshold value Vth1 ($V_{EDLC} \geq$ Vth1), the current target value attenuation processing is performed. On the other hand, in the case where the electric double layer capacitor 6 discharges by the charge/discharge instruction signal, when the voltage $V_{EDLC}$ has become lower than threshold value Vth2 ($V_{EDLC} \leq$ Vth2), the current target value attenuation processing is performed.

More specifically, the current target value attenuation processing upon charging of the electric double layer capacitor 6 is performed based on the following expression (1).

$$Iref(k) = \{(V_{MAX} - V_{EDLC})/(V_{MAX} - Vth1)\} \cdot Iref(k-1) \quad (1)$$

(Here, $V > V_{EDLC} \geq$ Vth1)

In expression (1), since ($V_{MAX}$–Vth1) is provided as a denominator, the maximum factor for the current target value attenuation processing is 1. Therefore, the stability of the control system is not disturbed.

On the other hand, the current target value attenuation processing upon discharging of the electric double layer capacitor 6 is performed based on the following expression (2).

$$Iref(k) = \{(V_{MIN} - V_{EDLC})/(V_{MIN} - Vth2)\} \cdot Iref(k-1) \quad (2)$$

(Here, $V_{MIN} < V_{EDLC} \leq$ Vth2)

In expression (2), since ($V_{MIN}$–Vth2) is provided as a denominator, the maximum factor for the current target value attenuation processing is 1. Therefore, the stability of the control system is not disturbed.

It is noted that in the above expressions (1) and (2), k is a natural number, and Iref(k–1) means data one sample before Iref(k).

The current control for the second DC/DC converter 7 by the control circuit 8 is general feedback control, in which the second DC/DC converter 7 is controlled such that the current Ic received from or outputted to the electric double layer capacitor 6 will coincide with the current target value Iref.

Thus, upon charging of the electric double layer capacitor 6, the current target value attenuation processing is performed when $V_{EDLC} \geq$ Vth1, and upon discharging of the electric double layer capacitor 6, the current target value attenuation processing is performed when $V_{EDLC} \leq$ Vth2.

However, in the state where the current target value attenuation processing based on the above expression (1) is ON (being executed) when $V_{EDLC} \geq$ Vth1 upon charging, if the charge/discharge instruction signal is switched to a discharge instruction, discharging from the electric double layer capacitor 6 is delayed unless the current target value attenuation processing is turned off (stopped) immediately.

In addition, in the state where the current target value attenuation processing based on the above expression (2) is ON (being executed) when $V_{EDLC} \geq$ Vth2 upon discharging, if the charge/discharge instruction signal is switched to a charge instruction, charging of the electric double layer capacitor 6 is delayed unless the current target value attenuation processing is turned off (stopped) immediately.

Thus, in the case where charging is switched to discharging during the current target value attenuation processing upon charging, or in the case where discharging is switched to charging during the current target value attenuation processing upon discharging, if charging or discharging of the electric double layer capacitor 6 is delayed, the braking energy of the vehicle cannot be retrieved efficiently.

Accordingly, in embodiment 1, in order to determine whether the present charge/discharge instruction signal is a charge instruction or a discharge instruction, and whether or not the charge/discharge instruction, signal has been switched from a charge instruction to a discharge instruction or from a discharge instruction to a charge instruction, the control circuit 8 obtains the charge/discharge instruction signal 10 from the external control unit (not shown). Then, based on the charge/discharge instruction signal 10, the control circuit 8 determines whether to perform the current target value attenuation processing based on the above expression (1) or (2), or determines whether to turn on or off the current target value attenuation processing. Thus, the current target value attenuation processing can be performed appropriately and can be turned on or off immediately. Therefore, the braking energy of the vehicle can be retrieved efficiently.

Next, the specific process of the current control for the second DC/DC converter 7 by the control circuit 8 when charging or discharging of the electric double layer capacitor 6 is performed based on the above description, will be described with reference to a flowchart shown in FIG. 4. It is noted that a symbol S denotes each step in the process.

First, the control circuit 8 determines the current target value Iref for the second DC/DC converter 7, based on the deviation $\Delta V$ (=Vbref–Vb) between the battery bus voltage target value Vbref and the battery bus voltage Vb (S1). It is noted that as described above, the battery bus voltage target value Vbref in this case has been determined based on the rated voltage of the battery 4, and the battery bus voltage Vb is a detected value.

Next, the control circuit 8 obtains the charge/discharge instruction signal 10 and determines whether or not the charge/discharge instruction signal is a charge instruction (S2). If the control circuit 8 has determined that the charge/discharge instruction signal is a charge instruction, the control circuit 8 determines whether or not $V_{EDLC} \geq$ Vth1 is satisfied (S3). If $V_{EDLC} \geq$ Vth1, the control circuit 8 executes the current target value attenuation processing based on the above expression (1) (S5). On the other hand, if the control circuit 8 has determined that the charge/discharge instruction signal is a discharge instruction, the control circuit 8 determines whether or not $V_{EDLC} \leq$ Vth2 is satisfied (S4). If $V_{EDLC} \leq$ Vth2, the control circuit 8 executes the current target value attenuation processing based on the above expression (2) (S5). In the above current target value attenuation processing in both cases, feedback control is performed for the second DC/DC converter 7 such that the current Ic received from or outputted to the electric double layer capacitor 6 will coincide with the current target value Iref.

It is noted that in the current target value attenuation processing, when $V_{EDLC}$ has reached $V_{MAX}$ or $V_{MIN}$, Iref(k) becomes "0" in expression (1) or (2) and therefore the processing is stopped. In addition, in the case where, for example, the charge/discharge instruction signal is switched from a charge instruction to a discharge instruction during the current target value attenuation processing, the determination result in S2 is NO and the determination result in S4 is also NO, and therefore the current target value attenuation processing is turned off (stopped). In addition, in the case where, for example, the charge/discharge instruction signal is switched from a discharge instruction to a charge instruction during the current target value attenuation processing, the determination result in S2 is YES and the determination result in S3 is also NO, and therefore the current target value attenuation processing is turned off (stopped).

In any case where the charge/discharge instruction signal is a charge instruction or a discharge instruction, if the voltage $V_{EDLC}$ of the electric double layer capacitor 6 is between the upper and lower threshold values Vth1 and Vth2 (Vth1>$V_{EDLC}$>Vth2), the control circuit 8 does not execute the current target value attenuation processing, and performs feedback control for the second DC/DC converter 7 such that the current Ic received from or outputted to the electric double layer capacitor 6 will coincide with the current target value Iref (S6).

As described above, in embodiment 1, the threshold values Vth1 and Vth2 are set for the voltage $V_{EDLC}$ of the electric double layer capacitor 6 in advance, and when charging or discharging of the electric double layer capacitor 6 is to be stopped, before the stopping processing, the current target value attenuation processing for the second DC/DC converter 7 is performed using the threshold values Vth1 and Vth2 as boundaries, thereby preventing occurrence of excess or deficiency of generated power due to response delay of the electric generator 1. As a result, even in the case of using the electric generator 1 with long response delay, it becomes possible to efficiently suppress occurrence of rapid voltage variation. Thus, the life of each section of the power supply system can be prolonged, and the battery voltage can be stabilized.

Embodiment 2

The entire configuration of a power supply system for vehicle according to embodiment 2 is basically the same as that of embodiment 1 shown in FIG. 1.

Figure 4:
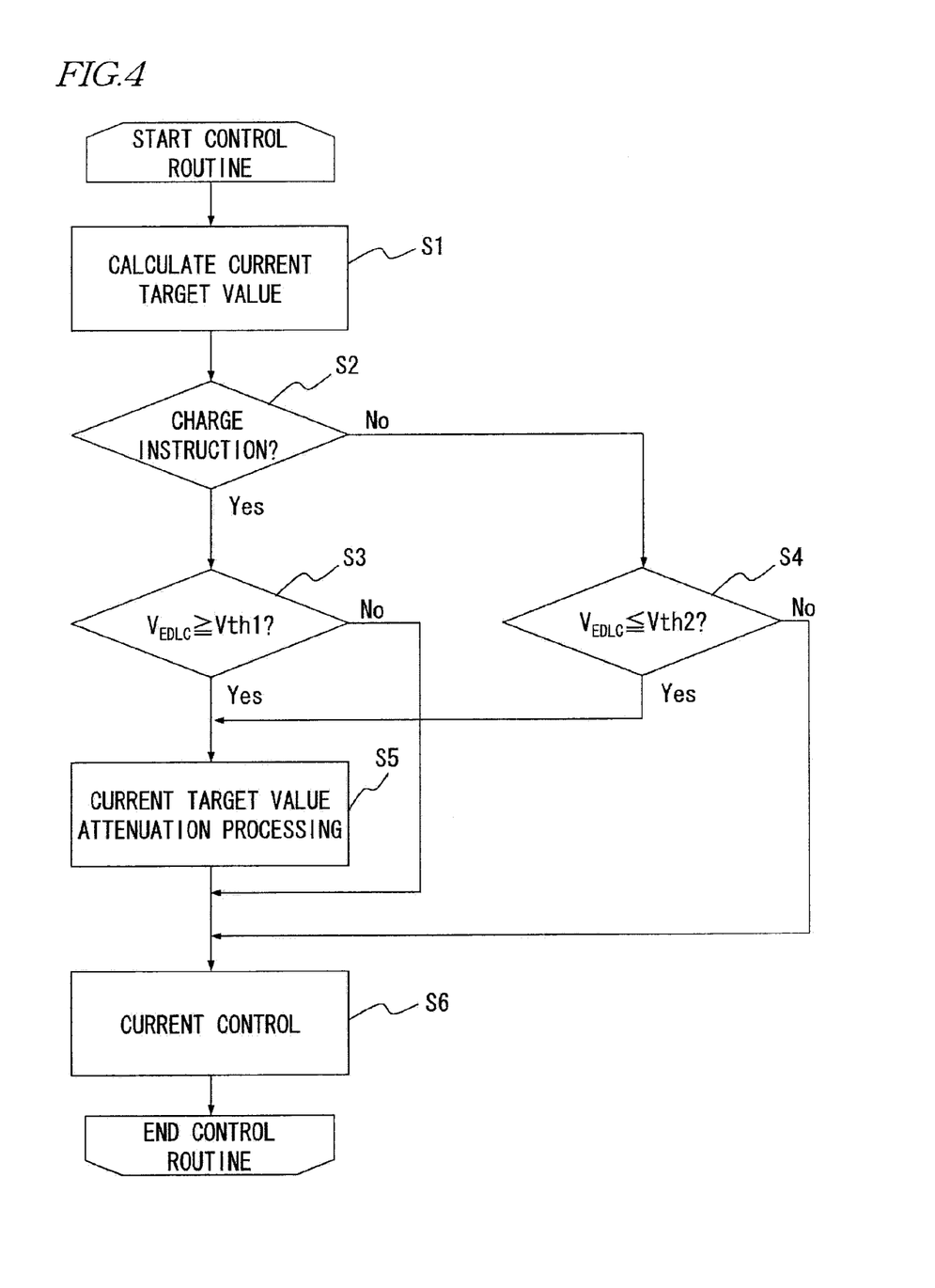
FIG. 4 is a flowchart showing a specific process of current control for a second DC/DC converter performed by a control circuit upon charging or discharging of an electric storage device, in the power supply system for vehicle according to embodiment 1 of the present invention.
Figure 5:
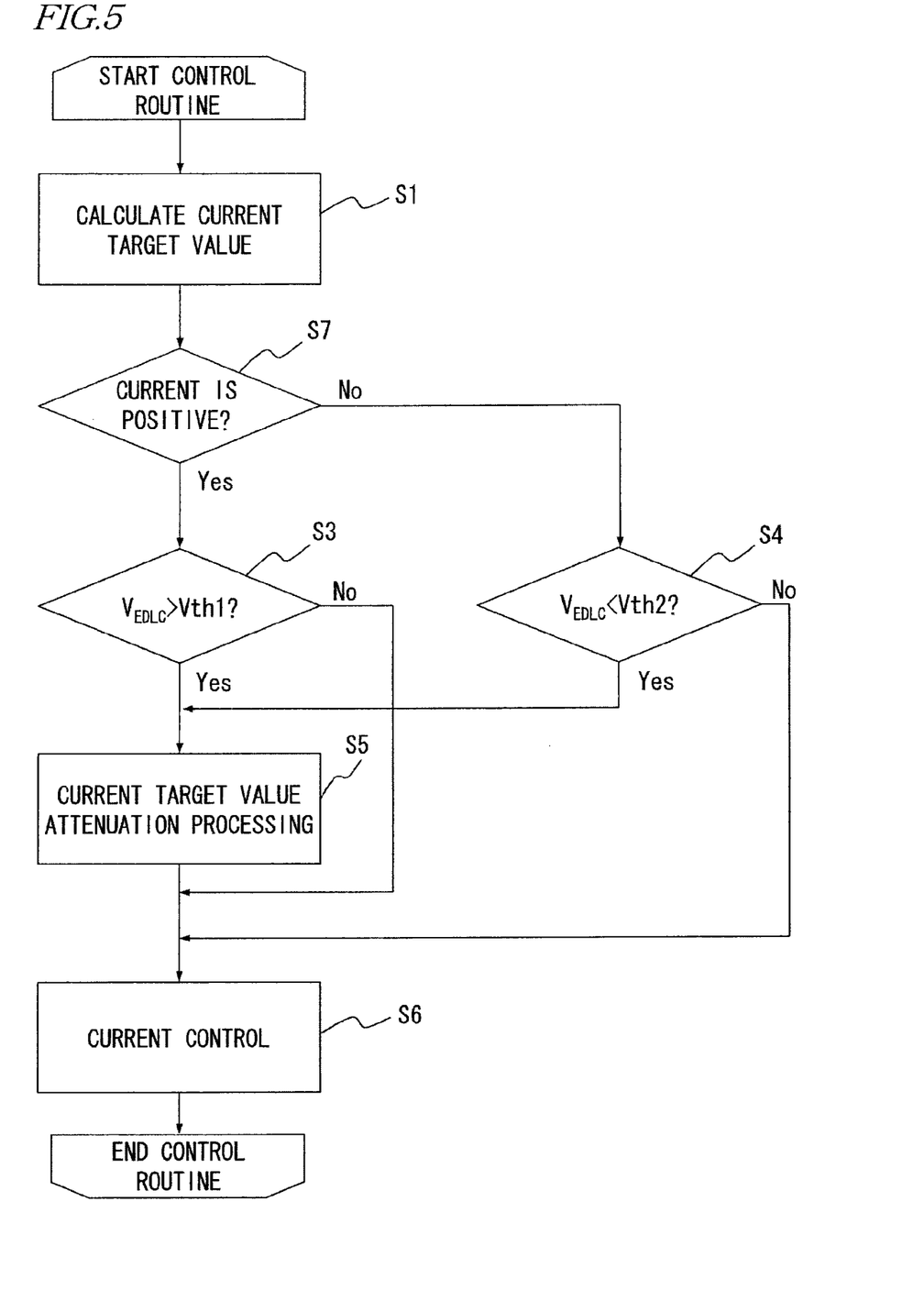
FIG. 5 is a flowchart showing a specific process of current control for a second DC/DC converter performed by a control circuit upon charging or discharging of an electric storage device, in a power supply system for vehicle according to embodiment 2 of the present invention.

Embodiment 2 is different from embodiment 1 in that, instead of the process based on the flowchart shown in FIG. 4, a process based on a flowchart shown in FIG. 5 is performed as the current control for the second DC/DC converter 7 by the control circuit 8.

That is, as described above, by the current control for the second DC/DC converter 7, charge processing for the electric double layer capacitor 6 is performed when the charge/discharge instruction signal is a charge instruction, and discharge processing is performed when the charge/discharge instruction signal is a discharge instruction. Therefore, along with this, the polarity of the current Ic received from or outputted to the electric double layer capacitor 6 changes between positive and negative.

Accordingly, in embodiment 2, instead of determining a charge instruction and a discharge instruction by obtaining the charge/discharge instruction signal 10 from the outside, a charge instruction and a discharge instruction are determined by referring to whether the current Ic of the second DC/DC converter 7 is positive or negative (S7 in FIG. 5). This configuration makes it unnecessary to obtain the charge/discharge instruction signal 10 from the outside when the control circuit 8 performs the current control for the second DC/DC converter 7, thereby simplifying the system.

It is noted that the other steps in the flowchart in FIG. 5 are the same as those in the flowchart in FIG. 4, and therefore the detailed description thereof is omitted here.

It is noted that, as described above, the current target value Iref for the second DC/DC converter 7 is calculated based on the deviation $\Delta Vb$ (=Vbref−Vb) between the battery bus voltage target value Vbref and the battery bus voltage Vb, and feedback control is performed for the second DC/DC converter 7 such that the current Ic received from or outputted to the electric double layer capacitor 6 will coincide with the current target value Iref. Therefore, for performing the current target value attenuation processing, whether the deviation $\Delta Vb$ between the battery bus voltage Vb and the voltage target value Vbo is positive or negative, or whether the current target value Iref for the second DC/DC converter 7 is positive or negative, may be determined, instead of determining whether the current Ic of the second DC/DC converter 7 is positive or negative.

Embodiment 3

The entire configuration of a power supply system for vehicle according to embodiment 3 is basically the same as that of embodiment 1 shown in FIG. 1.

Figure 6:
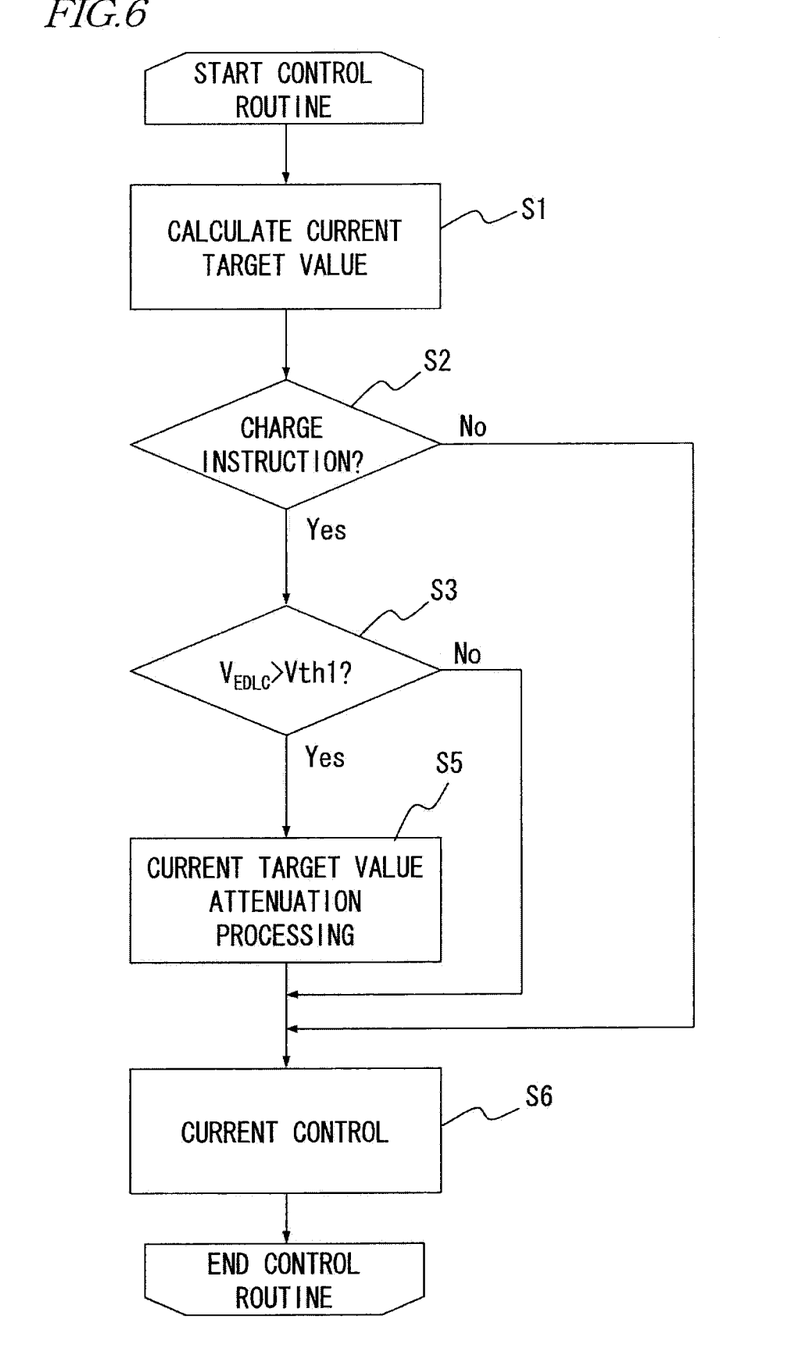
FIG. 6 is a flowchart showing a specific process of current control for a second DC/DC converter performed by a control circuit upon charging or discharging of an electric storage device, in a power supply system for vehicle according to embodiment 3 of the present invention.

Embodiment 3 is different from embodiment 1 in that, instead of the process based on the flowchart shown in FIG. 4, a process based on a flowchart shown in FIG. 6 is performed as the current control for the second DC/DC converter 7 by the control circuit 8. That is, in the flowchart in FIG. 6, the determination processing in S4 in FIG. 4 is omitted.

In embodiment 1, the current target value attenuation processing is performed in any case of charging or discharging of the electric double layer capacitor 6. On the other hand, in embodiment 3, the current target value attenuation processing upon discharging is omitted, and the current target value attenuation processing is executed only upon charging.

Upon charging, since generated power of the electric generator 1 is set to be large and the electric double layer capacitor 6 is in charged state, for suppressing voltage variation, it is greatly significant to execute the current target value attenuation processing when the voltage $V_{EDLC}$ of the electric double layer capacitor 6 has exceeded the threshold value Vth1. On the other hand, upon discharging, generated power of the electric generator 1 is set to be small for reducing load on the engine and the electric double layer capacitor 6 is in discharging state. Therefore, when the voltage $V_{EDLC}$ of the electric double layer capacitor 6 has become close to the lower limit value $V_{MIN}$ prescribed in advance, even if the operation of the second DC/DC converter 7 is stopped, it is less likely to cause large voltage variation as in the case of charging. Therefore, even if the current target value attenuation processing is executed only upon charging while the current target value attenuation processing is omitted upon discharging, there is a low possibility of leading to reduction of the life of the battery or failure of the first or second DC/DC converter 5 or 7. Accordingly, in embodiment 3, the current target value attenuation processing upon discharging is omitted, and the current target value attenuation processing is executed only upon charging.

It is noted that the other steps in the flowchart in FIG. 6 are the same as those in the flowchart in FIG. 4, and therefore the detailed description thereof is omitted here.

According to embodiment 3, upon charging, when charging of the electric double layer capacitor 6 is to be stopped, occurrence of excess or deficiency of generated power due to response delay of the electric generator 1 can be prevented, and in addition, the control processing by the control circuit 8 can be simplified.

Embodiment 4

The entire configuration of a power supply system for vehicle according to embodiment 4 is basically the same as that of embodiment 1 shown in FIG. 1.

In embodiment 3 (FIG. 6) described above, the current target value attenuation processing is performed only upon charging. In this case, as described in embodiment 2, the determination about a charge instruction and a discharge instruction can be performed by determining the positive/negative polarity of the current Ic received from or outputted to the electric double layer capacitor 6 by the second DC/DC converter 7.

Figure 7:
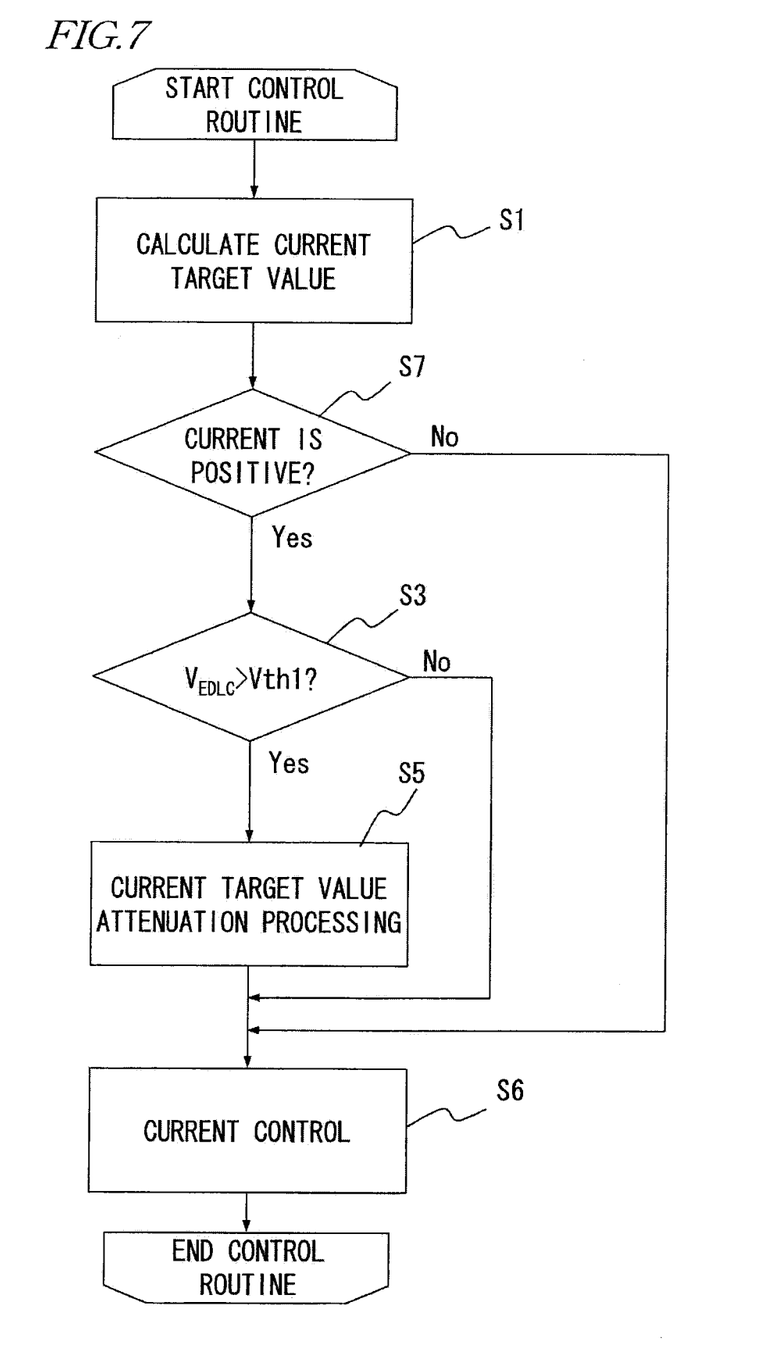
FIG. 7 is a flowchart showing a specific process of current control for a second DC/DC converter performed by a control circuit upon charging or discharging of an electric storage device, in a power supply system for vehicle according to embodiment 4 of the present invention.

Accordingly, in embodiment 4, in the current control for the second DC/DC converter 7 by the control circuit 8, whether or not the current Ic of the second DC/DC converter 7 is positive is determined for determining a charge instruction, and the current target value attenuation processing is performed only when the current Ic of the second DC/DC converter 7 is positive. That is, instead of the determination about whether or not a charge instruction has been given in step S3 of embodiment 3 (FIG. 6), in embodiment 4, whether or not the current Ic received from or outputted to the electric double layer capacitor 6 is positive is determined in step S7.

Owing to the above configuration, upon charging, when charging of the electric double layer capacitor 6 is to be stopped, occurrence of excess or deficiency of generated power due to response delay of the electric generator 1 can be prevented, and in addition, since whether or not charging is currently being performed is determined based on whether or not the current of the second DC/DC converter 7 is positive, it becomes unnecessary to obtain the charge/discharge instruction signal from the outside, whereby the system can be simplified.

It is noted that the other steps in the flowchart in FIG. 7 are the same as those in the flowchart in FIG. 6, and therefore the detailed description thereof is omitted here.

It is noted that also in embodiment 4, as in embodiment 2, for performing the current target value attenuation processing, whether the deviation $\Delta Vb$ between the battery bus voltage Vb and the voltage target value Vbo is positive or negative, or whether the current target value Iref for the second DC/DC converter 7 is positive or negative, may be determined, instead of determining whether the current Ic of the second DC/DC converter 7 is positive or negative.

Embodiment 5

The entire configuration of a power supply system for vehicle according to embodiment 5 is basically the same as that of embodiment 1 shown in FIG. 1.

In the above embodiment 1, as the first DC/DC converter 5, a DC/DC converter of constant-input-voltage type which keeps its input end at predetermined target voltage, or a DC/DC converter of constant-step-up/down-ratio type which keeps its input-output voltage ratio at a predetermined target voltage ratio, has been applied. In addition, as the second DC/DC converter 7, a DC/DC converter of current mode type which controls the current Ic received from or outputted to the electric double layer capacitor 6 so as to keep the battery bus voltage Vb at the predetermined battery bus voltage target value Vbref, has been applied.

On the other hand, in the power supply system for vehicle of embodiment 5, as the first DC/DC converter 5, a DC/DC converter of constant-output-voltage type which keeps its output end at predetermined target voltage, or a DC/DC converter of constant-step-up/down-ratio type which keeps its input-output voltage ratio at a predetermined target voltage ratio, is applied. In addition, as the second DC/DC converter 7, a DC/DC converter of current mode type which controls the current Ic received from or outputted to the electric double layer capacitor 6 so as to keep the electric generation bus voltage Va at a predetermined electric generation bus voltage target value Varef, is applied.

That is, the control circuit 8 determines the current target value Iref for the second DC/DC converter 7 to perform charging or discharging of the electric double layer capacitor 6, based on a deviation $\Delta Va$ (=Varef−Va) between the electric generation bus voltage target value Varef set in advance and the detected electric generation bus voltage Va. In addition, the electric generator 1 controls its generated power so as to make the detected electric generation bus voltage Va converge to the electric generation bus voltage target value Varef for the electric generator 1. Except for the above point, the configuration of the power supply system for vehicle is the same as that of the above embodiment 1.

Owing to the configuration of embodiment 5, the electric generator 1 can control the electric generation bus voltage Va, whereby the electric generation bus voltage Va can be maintained at predetermined voltage.

The invention claimed is:

1. A power supply system for vehicle, comprising:
   an electric generator driven by an engine, for generating AC power;
   a rectifier for rectifying the AC power generated by the electric generator to DC power and outputting the DC power to an electric generation bus;
   a battery for supplying power to an in-vehicle load via a battery bus;
   a first DC/DC converter for performing voltage conversion, having an input end connected to the electric generation bus and an output end connected to the battery bus, the first DC/DC converter being controlled so as to cause voltage at the input end to be one of a plurality of target voltages and cause voltage at the output end to adapt to voltage of the battery;
   an electric storage device for storing generated power from the electric generator, thereby absorbing power variation;
   a second DC/DC converter for performing voltage conversion, having an input end connected to the electric generation bus and an output end connected to the electric storage device; and
   a control circuit for controlling the first and second DC/DC converters, wherein
   the second DC/DC converter is a DC/DC converter of current-control type which keeps current for the electric storage device at a predetermined current target value, and
   the control circuit sets a current target value which is a control target value for the second DC/DC converter, based on at least one of a voltage value of the electric generation bus and the voltage value of the battery bus, and when charging of the electric storage device is to be stopped based on a charge/discharge instruction signal, performs, before the charging is stopped, control of gradually attenuating the current target value for the second DC/DC converter, based on the voltage value of the electric storage device.

2. The power supply system for vehicle according to claim 1, wherein the control circuit, when discharging of the electric storage device is to be stopped based on a charge/discharge instruction signal, performs, before the charging is stopped, control of gradually attenuating the current target value for the second DC/DC converter, based on the voltage value of the electric storage device.

3. The power supply system for vehicle according to claim 2, wherein the control circuit determines whether the charge/discharge instruction signal is charge instruction or a discharge instruction, based on the charge/discharge instruction signal obtained from the outside.

4. The power supply system for vehicle according to claim 2, wherein the control circuit determines whether the charge/discharge instruction signal is a charge instruction or a discharge instruction, based on whether current of the second DC/DC converter is positive or negative.

5. The power supply system for vehicle according to claim 2, wherein the control circuit determines whether the charge/discharge instruction signal is a charge instruction or a discharge instruction, based on whether the current target value for the second DC/DC converter is positive or negative.

6. The power supply system for vehicle according to claim 2, wherein the control circuit determines whether the charge/discharge instruction signal is a charge instruction or a discharge instruction, based on whether the deviation between the voltage value of the battery bus and the voltage target value for the battery bus is positive or negative.

7. The power supply system for vehicle according to claim 1, wherein the control circuit determines whether the charge/discharge instruction signal is a charge instruction or a discharge instruction, based on the charge/discharge instruction signal obtained from the outside.

8. The power supply system for vehicle according to claim 1, wherein the control circuit determines whether the charge/discharge instruction signal is a charge instruction or a discharge instruction, based on whether current of the second DC/DC converter is positive or negative.

9. The power supply system for vehicle according to claim 1, wherein the control circuit determines whether the charge/discharge instruction signal is a charge instruction or a discharge instruction, based on whether the current target value for the second DC/DC converter is positive or negative.

10. The power supply system for vehicle according to claim 1, wherein the control circuit determines whether the charge/discharge instruction signal is a charge instruction or a discharge instruction, based on whether the deviation between the voltage value of the battery bus and the voltage target value for the battery bus is positive or negative.

* * * * *